US011275959B2

(12) United States Patent
Rowe

(10) Patent No.: US 11,275,959 B2
(45) Date of Patent: Mar. 15, 2022

(54) SYSTEMS AND METHODS FOR ENROLLMENT IN A MULTISPECTRAL STEREO FACIAL RECOGNITION SYSTEM

(71) Applicant: ASSA ABLOY AB, Stockholm (SE)

(72) Inventor: Robert Kjell Rowe, Corrales, NM (US)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 16/922,456

(22) Filed: Jul. 7, 2020

(65) Prior Publication Data
US 2022/0012511 A1     Jan. 13, 2022

(51) Int. Cl.
*G06K 9/00*          (2006.01)
*G06N 3/08*          (2006.01)

(52) U.S. Cl.
CPC ..... *G06K 9/00926* (2013.01); *G06K 9/00295* (2013.01); *G06K 9/00899* (2013.01); *G06N 3/08* (2013.01)

(58) Field of Classification Search
CPC .......... G06K 9/00926; G06K 9/00295; G06K 9/00899; G06K 9/6274; G06K 9/00228; G06K 9/00624; G06K 9/00979; G06K 9/00335; G06K 9/36; G06K 9/6267; G06K 9/64; G06K 9/00208; G06K 9/00201; G06K 9/6282; G06K 9/00288; G06K 2009/00939; G06K 9/00214; G06K 9/00476; G06K 9/00892; G06K 9/3233; G06K 9/627; G06K 9/6273; G06K 9/628; G06N 3/08; G06N 3/0454; G06N 3/04; G06N 5/022; G06N 20/00; G06N 3/02; G06N 3/088; G06N 20/10; G06N 3/0436; G06T 2207/20084;
(Continued)

(56) References Cited
U.S. PATENT DOCUMENTS
8,437,513 B1    5/2013    Derakhshani et al.
9,607,138 B1    3/2017    Baldwin et al.
(Continued)

FOREIGN PATENT DOCUMENTS
EP         2506189        10/2012
WO    WO-2019152983 A2    8/2019
(Continued)

OTHER PUBLICATIONS
"International Application Serial No. PCT/EP2020/078413, International Search Report dated Jan. 27, 2021", 4 pgs.
(Continued)

*Primary Examiner* — Nimesh Patel
(74) *Attorney, Agent, or Firm* — Schwegman Lundberg & Woessner, P.A.

(57) ABSTRACT

A computing machine accesses conventional image data comprising a photograph of a first person. The computing machine converts, using a conventional image neural network adapter engine, the conventional image data into a model data format representing the first person, wherein the model data format is a format that is standardized for both conventional image data and stereo pair image data. The computing machine generates, using a biometric task neural network engine and based on the model data format data representing the first person, a task output representing the first person. The computing machine transmits a representation of the task output representing the first person.

20 Claims, 8 Drawing Sheets

(58) Field of Classification Search
CPC ......... G06T 7/0012; G06T 2207/20081; G06T 2207/20212; G06T 19/20; G06T 2207/10016; G06T 7/20; G06T 17/00; G06T 3/4046; G06T 5/50
See application file for complete search history.

(56) References Cited

U.S. PATENT DOCUMENTS

| | | | |
|---|---|---|---|
| 2006/0062438 A1 | 3/2006 | Rowe | |
| 2006/0078323 A1 | 4/2006 | Nakahara | |
| 2008/0158612 A1 | 7/2008 | Iwasaki | |
| 2016/0163053 A1* | 6/2016 | Tang | H04N 5/2329 348/135 |
| 2017/0076145 A1* | 3/2017 | Gottemukkula | G06K 9/4642 |
| 2017/0180348 A1* | 6/2017 | Piccolotto | G06K 9/00355 |
| 2017/0323507 A1 | 11/2017 | Masuda et al. | |
| 2017/0344793 A1 | 11/2017 | Xue et al. | |
| 2017/0345146 A1 | 11/2017 | Fan et al. | |
| 2017/0351929 A1 | 12/2017 | Kim | |
| 2018/0025217 A1 | 1/2018 | Chandraker et al. | |
| 2018/0025244 A1 | 1/2018 | Bohl et al. | |
| 2019/0026957 A1* | 1/2019 | Gausebeck | G06T 7/593 |
| 2019/0139206 A1 | 5/2019 | Derakhshani | |
| 2019/0205622 A1 | 7/2019 | Hong | |
| 2019/0213816 A1 | 7/2019 | Grigorov et al. | |
| 2019/0286885 A1* | 9/2019 | Liu | G06K 9/6273 |
| 2019/0356905 A1 | 11/2019 | Godard et al. | |
| 2019/0373186 A1* | 12/2019 | Ortiz Egea | G06K 9/00268 |
| 2020/0026941 A1 | 1/2020 | Tan et al. | |
| 2020/0082160 A1 | 3/2020 | Li et al. | |
| 2020/0134342 A1 | 4/2020 | Parupati et al. | |
| 2020/0210738 A1 | 7/2020 | Parupati et al. | |
| 2020/0226777 A1* | 7/2020 | Luo | G06T 7/593 |
| 2020/0334894 A1* | 10/2020 | Long | G06T 15/205 |
| 2021/0064901 A1 | 3/2021 | Vorobiev et al. | |
| 2021/0110018 A1 | 4/2021 | Rowe et al. | |
| 2021/0110185 A1 | 4/2021 | Rowe | |

FOREIGN PATENT DOCUMENTS

| | | |
|---|---|---|
| WO | WO-2021074032 A1 | 4/2021 |
| WO | WO-2021074034 A1 | 4/2021 |

OTHER PUBLICATIONS

"International Application Serial No. PCT/EP2020/078413, Written Opinion dated Jan. 27, 2021", 7 pgs.
"International Application Serial No. PCT/EP2020/078426, International Search Report dated Jan. 21, 2021", 4 pgs.
"International Application Serial No. PCT/EP2020/078426, Written Opinion dated Jan. 21, 2021", 6 pgs.
Das, Abhijit, "Recent Advances in Biometric Technology for Mobile Devices", IEEE 9th International Conference on Biometrics Theory, Applications and Systems (BTAS), (Oct. 22, 2018), 11 pgs.
Ebihara, Akinori F, "Specular- and Diffuse-reflection-based Face Liveness Detection for Mobile Devices", arXiv.1907.12400v1 [cs.CV], Cornell University Library, Ithaca, NY, (Jul. 29, 2019), 10 pgs.
Feng, Litong, "Integration of image quality and motion cues for face anti-spoofing: A neural network approach", Journal of Visual Communication and Image Representation, Academic Press, Inc, US, vol. 38, (Apr. 2016), 451-460.
Rehman, Yasar Abbas Ur, "SLNet: Stereo face liveness detection via dynamic disparity-maps and convolutional neural network", Expert Systems With Applications, Oxford, GB, vol. 142, (Oct. 5, 2019), 12 pgs.
Sooyeon, Kim, "Face Liveness Detection Using Defocus", SENSORS, vol. 15, No. 1, (Jan. 14, 2015), 1537-1563.
U.S. Appl. No. 16/601,839, filed Oct. 15, 2019, Systems and Methods for Using Focal Stacks for Image-Based Spoof Detection.
U.S. Appl. No. 16/601,851, filed Oct. 15, 2019, Systems and Methods for Using Machine Learning for Image-Based Spoof Detection.
"U.S. Appl. No. 16/601,839, Non Final Office Action dated May 27, 2021", 23 pgs.
"U.S. Appl. No. 16/601,839, Response filed Jul. 15, 2021 to Non Final Office Action dated May 27, 2021", 10 pgs.
"U.S. Appl. No. 16/601,851, Non Final Office Action dated Jun. 10, 2021", 30 pgs.
"U.S. Appl. No. 16/601,851, Response filed Sep. 10, 2021 to Non Final Office Action dated Jun. 10, 2021", 18 pgs.
"International Application Serial No. PCT/EP2021/068617, International Search Report dated Oct. 12, 2021", 4 pgs.
"International Application Serial No. PCT/EP2021/068617, Written Opinion dated Oct. 12, 2021", 5 pgs.
Husseis, et al., "A Survey in Presentation Attack and Presentation Attack Detection", International Carnahan Conference on Security Technology, (Oct. 1-3, 2019).
Kim, et al., "Face liveness detection using variable focusing", IEEE Biometrics Compendium, (Jun. 4-7, 2013).
Raja, et al., "Robust face presentation attack detection on smartphones: An approach based on variable focus", IEEE International Joint Conference on Biometrics (IJCB), (Oct. 1-4, 2017).
Sohn, Kihyuk, et al., "Unsupervised Domain Adaptation for Face Recognition in Unlabeled Videos", 2017 IEEE International Conference On Computer Vision (ICCV), (Oct. 1, 2017), 5917-5925.
Wang, et al., "Exploiting temporal and depth information for multi-frame face anti-spoofing", arXiv:1811.05118v3 [cs.CV], (2019), 15 pgs.
Zhao, Yunhan, et al., "Stretching Domain Adaptation: How far is too far?", arxiv.org, Cornell University Library, 201 Olin Library Cornell University Ithaca, NY 14853, (Dec. 6, 2017).
"U.S. Appl. No. 16/601,839, Final Office Action dated Oct. 20, 2021", 26 pgs.
Czajka, "Presentation attack detection for iris recognition—an assessment of the state of the art", arXiv:1804.00194v3, (Jun. 13, 2018), 35 pgs.
"U.S. Appl. No. 16/601,851, Notice of Allowance dated Nov. 29, 2021", 9 pgs.
"U.S. Appl. No. 16/601,839, Response filed Dec. 17, 21 to Final Office Action dated Oct. 20, 2021", 10 pgs.
Di Martino, J. Matias, "Liveness Detection Using Implicit 3D Features", arXiv: 1804.06702v2, (Apr. 19, 2018), 21 pgs.
Pang, Jiahao, "Cascade Residual Learning: A Two-Stage Convolutional Neural Network for Stereo Matching", IEEE International Conference on Computer Vision Workshops, Date of Conference: Oct. 22-29, 2017, (2017), 9 pgs.
Zhong, Yiran, "Open-World Stereo Video Matching with Deep RNN", arXiv: 1808.03959v1, (Aug. 12, 2018), 16 pgs.

* cited by examiner

SYSTEMS AND METHODS FOR ENROLLMENT IN A MULTISPECTRAL STEREO FACIAL RECOGNITION SYSTEM

RELATED APPLICATION

This application relates to U.S. patent application Ser. No. 16/601,851, filed on Oct. 15, 2019, and titled, "SYSTEMS AND METHODS FOR USING MACHINE LEARNING FOR IMAGE-BASED SPOOF DETECTION," and U.S. patent application Ser. No. 16/601,839, filed on Oct. 15, 2019, and titled, "SYSTEMS AND METHODS FOR USING FOCAL STACKS FOR IMAGE-BASED SPOOF DETECTION," the entire disclosures of which are incorporated herein by reference.

TECHNICAL FIELD

Embodiments pertain to computer architecture. Some embodiments relate to artificial neural networks and biometrics. Some embodiments relate to systems and methods for enrollment in a multispectral stereo facial recognition system.

BACKGROUND

Facial recognition technologies have multiple use cases. One use case may be for allowing authorized persons (and disallowing unauthorized persons) to enter a secure physical location. Traditionally, conventional images have been used for facial recognition. Conventional images may be generated by a typical camera, such as the camera residing on an Apple iPhone 8® or Google Pixel 3A®. However, using stereo image pairs with facial recognition technologies may provide certain advantages. Stereo image pairs include images taken using two at least two proximate lenses. One challenge in the adoption of stereo pair-based facial recognition technologies is that there may be a high cost to transition from conventional images to stereo image pairs, as all of the authorized persons would need to have their images taken by a stereo pair imaging device and re-enroll into the facial recognition system. Techniques for eliminating or reducing this re-enrollment cost may be desirable. In addition, using conventional imagers (e.g., smart phone camera(s)) to enroll in a stereo pair-based facial recognition system may be useful.

SUMMARY

Figure 1:
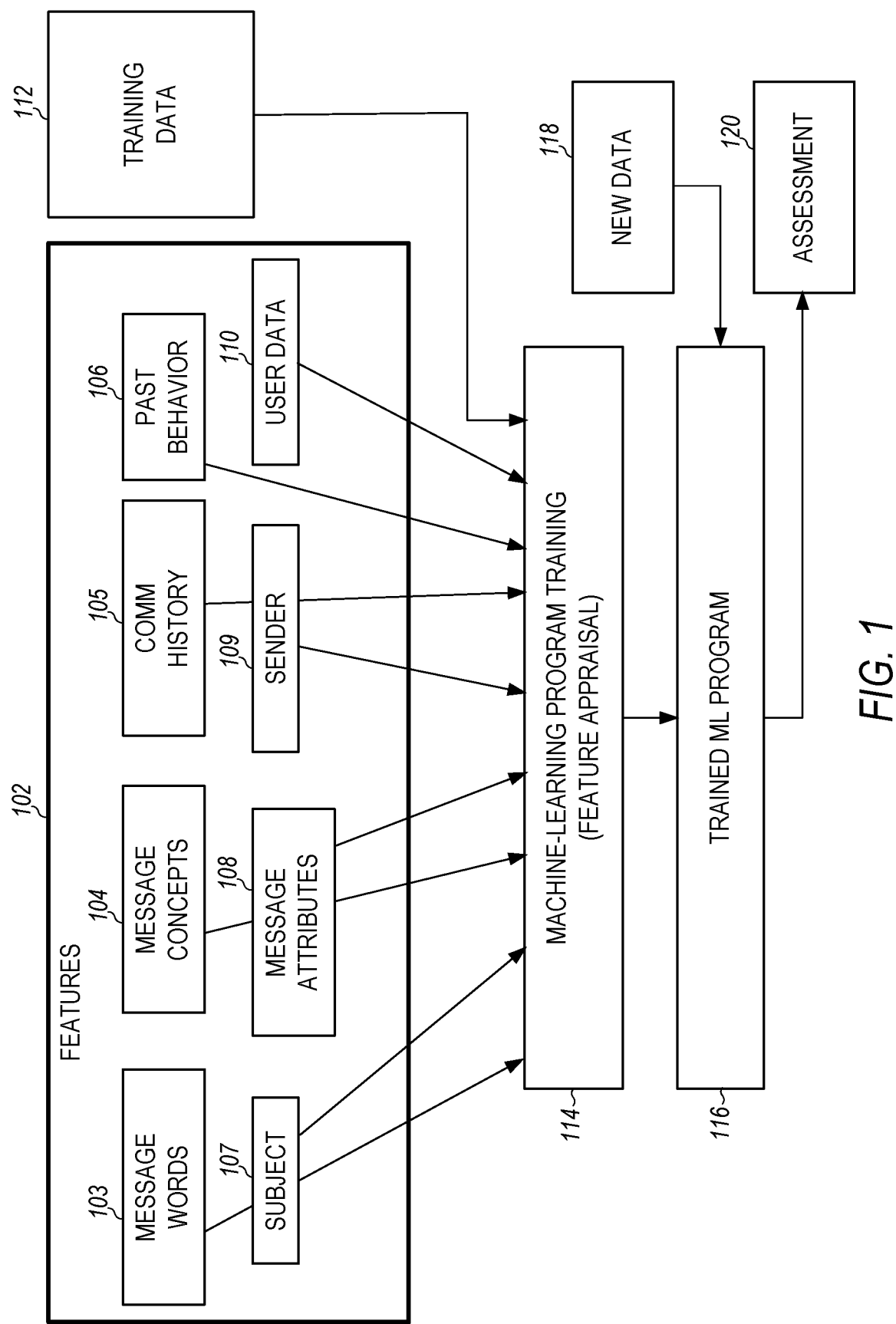
FIG. 1 illustrates the training and use of a machine-learning program, in accordance with some embodiments.

The present disclosure generally relates to systems and methods for enrollment in a multispectral stereo facial recognition system.

According to some aspects of the technology described herein, a method comprises accessing conventional image data comprising a photograph of a first person. The method comprises converting, using a conventional image neural network adapter engine, the conventional image data into a model data format representing the first person, wherein the model data format is a format that is standardized for both conventional image data and stereo image pair data. The method comprises generating, using a biometric task neural network engine and based on the model data format data representing the first person, a task output representing the first person. The method comprises transmitting a representation of the task output representing the first person.

Other aspects include a machine-readable medium storing instructions to perform one or more of the above methods and a system comprising processing circuitry and memory, the memory storing instructions which, when executed by the processing circuitry, cause the processing circuitry to perform one or more of the above methods.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

As discussed above, facial recognition technologies have multiple use cases. One use case may be for allowing authorized persons (and disallowing unauthorized persons) to enter a secure physical location (e.g., an office building) or access an electronic resource. Traditionally, conventional image-based facial recognition technologies have been used for this purpose. However, stereo image pair-based facial recognition technologies may provide certain advantages. One challenge in the adoption of stereo image pair-based facial recognition technologies is that there may be a high cost to transition from conventional image-based to stereo image pair-based facial recognition technologies, as all of the authorized persons would need to re-enroll into the facial recognition system (e.g., by providing stereo pair, rather than conventional images of themselves or by appearing for a new photo session). Techniques for eliminating or reducing this re-enrollment cost may be desirable. Techniques for using conventional images to enroll in a stereo image pair-based facial recognition system may be desirable. Some aspects of the technology described herein are directed to techniques for enrollment in a multispectral stereo facial recognition system.

As used herein, the phrase, "biometric task," may include, among other things, any computerized biometric (i.e., related to body measurement and calculation) processing task that generates an output, referred to as a "task output." A biometric task may include, among other things, one of or more of template generation, identity verification (1:1), identification (1:N), spoof detection (i.e., presentation attack detection or closely related liveness detection), or demographic or appearance estimation of various kinds including gender, age, ethnicity, skin tone, and the like. The template generation may generate a template that can be used for future identity verification or identification.

As used herein, the phrase, "conventional image," may include, among other things, an image (or set of images) that includes pixels arranged in two dimensions (e.g., x and y dimensions), with each pixel having a binary, greyscale or color (e.g., red/green/blue) representation. A conventional image may be generated by a camera or camera system that includes one or more lenses. A conventional image depicts a scene in two dimensions (2D) but the data describing that image is three-dimensional (two spatial dimensions and a color dimension—typically comprised of three elements: red, green, and blue intensities, however, alternative color measurements, for example, YUV, YCrCb, may be used). In some cases, a 2D image may be grayscale, in which case the third dimension is just one element—intensity.

As used herein, the phrase, "stereo image pair," may include, among other things two or more images each of which includes pixels arranged in two dimensions (e.g., x and y dimensions), with each pixel having a binary, greyscale, or color (e.g., red/green/blue) representation. In some cases, a 2D image may be grayscale or binary, in which case the third dimension is just one element—intensity. In some cases, one of the two or more images may be an infrared image, with pixels being represented in any manner known to skilled persons to represent infrared image data. The two or more images may be generated using a camera or camera system with two or more lenses (or a single lens that moves positions). The two or more lenses may have the same spectral response or different spectral responses. The spectral response may be narrow (monochrome) or broad. The two or more images may be generated at approximately the same time (e.g., within one minute, 10 seconds, one second, 0.5 seconds of one another). A stereo image pair may be useful in biometric task(s) due to the existence of views of an object (e.g., a face) from different angles.

In conjunction with some embodiments of the technology disclosed herein, one or more of the camera/imaging systems described in Table 1 may be used.

TABLE 1

Camera/imaging systems.

| System | Spatial dimensionality of raw images | Spatial dimensionality of processed images | Total dimensionality of data volume |
| --- | --- | --- | --- |
| Ordinary B/W imager | 2D | 2D | Either 2D (nx × ny) or 3D (nx × ny × 1) |
| Ordinary color imager | 2D | 2D | 3D (nx × ny × colors [usually 3: RGB]) |
| Ordinary stereo imager | 2D | 3D (nx × ny × nz) | 3D if monochrome (usually) or 4D if color (nx × ny × nz × c colors) |
| Ordinary ToF imager | 3D | 3D | 3D |

TABLE 1-continued

Camera/imaging systems.

| System | Spatial dimensionality of raw images | Spatial dimensionality of processed images | Total dimensionality of data volume |
| --- | --- | --- | --- |
| Multispectral stereo imager | 2D | 2D | 3D |

Some embodiments provide a technical solution to a technical problem. According to some embodiments, the technical problem is enrolling multiple (e.g., on the order of 1,000 or 10,000) users in a multispectral stereo facial recognition system using only a conventional image of the person. The conventional image may be obtained from a data repository (e.g., a data repository of images created for employee badges of the users) or some users may provide conventional images of themselves. The conventional images may be selfies taken with a smartphone (e.g., an iPhone 8® manufactured by Apple Corporation of Cupertino, Calif. or a Google Pixel 3A® manufactured by Google Corporation of Mountain View, Calif.) or a webcam.

In some embodiments, the technical solution is implemented at a server. The server accesses conventional image data comprising a photograph of a first person. The server converts, using a conventional image neural network adapter engine, the conventional image data into a model data format representing the first person. The model data format is a format that is standardized for both conventional image data and stereo image pair data. The server generates, using a biometric task neural network engine and based on the model data format data representing the first person, a task output representing the first person. The server transmits a representation of the task output representing the first person.

In some embodiments, the server accesses stereo image pair data representing a second person. The stereo image pair data comprises at least a first image from a first lens position and a second image from a second lens position. The first lens position is different from the second lens position. The server converts the stereo image pair data into model data format data representing the second person. The server generates, using the biometric task neural network engine and based on the model data format data representing the second person, a task output representing the second person. The server transmits a representation of the task output representing the second person.

A multispectral stereo imaging device receives multispectral stereo image data (e.g., stereo image pair data) from cameras (which may be part of the multispectral stereo imaging device or connected to the multispectral stereo imaging device). The multispectral stereo image data may be received in real-time, for example, when an end-user attempts to access a physical location or electronic resource secured by the multispectral stereo imaging device. The multispectral stereo imaging device determines whether the specific person (or one of multiple previously-identified specific persons) is represented in the multispectral stereo image data. The multispectral stereo imaging device controls access to the physical location (e.g., via a physical gate) or the electronic resource (e.g., by opening an application, providing access to a file or unlocking a computing machine) based on whether the specific person is represented in the multispectral stereo image data. If the multispectral stereo imaging device is unable to detect the specific person, the end-user may be able to access the physical location or the electronic resource in another manner, for example, by presenting an identity document to a security guard, entering a password, or scanning a barcode (e.g., on an employee badge).

Advantages provided by some embodiments include increased efficiency in installing stereo image pair-based facial recognition system(s) or in transitioning from conventional image-based to stereo image pair-based facial recognition system(s), where multiple users need to be enrolled. Advantageously, a photograph taken by a stereo image pair imager of some user(s) need not be taken at all (or need not be taken immediately) to enroll the user(s). However, if a user is not enrolled successfully using the above technique, he/she may have a stereo image pair imager photograph of him/herself taken (e.g., by the cameras of the multispectral stereo imaging device) and used for enrollment.

Aspects of the present invention may be implemented as part of a computer system. The computer system may be one physical machine, or may be distributed among multiple physical machines, such as by role or function, or by process thread in the case of a cloud computing distributed model. In various embodiments, aspects of the invention may be configured to run in virtual machines that in turn are executed on one or more physical machines. It will be understood by persons of skill in the art that features of the invention may be realized by a variety of different suitable machine implementations.

The system includes various engines, each of which is constructed, programmed, configured, or otherwise adapted, to carry out a function or set of functions. The term engine as used herein means a tangible device, component, or arrangement of components implemented using hardware, such as by an application specific integrated circuit (ASIC) or field-programmable gate array (FPGA), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software.

In an example, the software may reside in executable or non-executable form on a tangible machine-readable storage medium. Software residing in non-executable form may be compiled, translated, or otherwise converted to an executable form prior to, or during, runtime. In an example, the software, when executed by the underlying hardware of the engine, causes the hardware to perform the specified operations. Accordingly, an engine is physically constructed, or specifically configured (e.g., hardwired), or temporarily configured (e.g., programmed) to operate in a specified manner or to perform part or all of any operations described herein in connection with that engine.

Considering examples in which engines are temporarily configured, each of the engines may be instantiated at different moments in time. For example, where the engines comprise a general-purpose hardware processor core configured using software; the general-purpose hardware processor core may be configured as respective different engines at different times. Software may accordingly configure a hardware processor core, for example, to constitute a particular engine at one instance of time and to constitute a different engine at a different instance of time.

In certain implementations, at least a portion, and in some cases, all, of an engine may be executed on the processor(s) of one or more computers that execute an operating system, system programs, and application programs, while also implementing the engine using multitasking, multithreading, distributed (e.g., cluster, peer-peer, cloud, etc.) processing where appropriate, or other such techniques. Accordingly, each engine may be realized in a variety of suitable configurations, and should generally not be limited to any particular implementation exemplified herein, unless such limitations are expressly called out.

In addition, an engine may itself be composed of more than one sub-engines, each of which may be regarded as an engine in its own right. Moreover, in the embodiments described herein, each of the various engines corresponds to a defined functionality. However, it should be understood that in other contemplated embodiments, each functionality may be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

As used herein, the term "convolutional neural network" or "CNN" may refer, among other things, to a neural network that is comprised of one or more convolutional layers (often with a subsampling operation) and then followed by one or more fully connected layers as in a standard multilayer neural network. In some cases, the architecture of a CNN is designed to take advantage of the 2D structure of an input image (or other 2D input such as a speech signal). This is achieved with local connections and tied weights followed by some form of pooling which results in translation invariant features. In some cases, CNNs are easier to train and have many fewer parameters than fully connected networks with the same number of hidden units. In some embodiments, a CNN includes multiple hidden layers and, therefore, may be referred to as a deep neural network (DNN). CNNs are generally described in "ImageNet Classification with Deep Convolutional Neural Networks," part of "Advances in Neural Information Processing Systems 25" (NIPS 2012) by Alex Krizhevsky, Ilya Sutskever, and Geoffrey E. Hinton, available at: papers.nips.cc/paper/4824-imagenet-classification-with-deep-convolutional-neural-networ, last visited 28 Aug. 2019, the entire content of which is incorporated herein by reference.

As used herein, the phrase "computing machine" encompasses its plain and ordinary meaning. A computing machine may include, among other things, a single machine with a processor and a memory or multiple machines that have access to one or more processors or one or more memories, sequentially or in parallel. A server may be a computing machine. A client device may be a computing machine. A data repository may be a computing machine.

Throughout this document, some method(s) (e.g., in FIG. 8) are described as being implemented serially and in a given order. However, unless explicitly stated otherwise, the operations of the method(s) may be performed in any order. In some cases, two or more operations of the method(s) may be performed in parallel using any known parallel processing techniques. In some cases, some of the operation(s) may be skipped and/or replaced with other operations. Furthermore, skilled persons in the relevant art may recognize other operation(s) that may be performed in conjunction with the operation(s) of the method(s) disclosed herein.

FIG. 1 illustrates the training and use of a machine-learning program, according to some example embodiments.

In some example embodiments, machine-learning programs (MLPs), also referred to as machine-learning algorithms or tools, are utilized to perform operations associated with machine learning tasks, such as image recognition or machine translation.

Machine learning (ML) is a field of study that gives computers the ability to learn without being explicitly programmed. Machine learning explores the study and construction of algorithms, also referred to herein as tools, which may learn from existing data and make predictions about new data. Such machine-learning tools operate by building a model from example training data 112 in order to make data-driven predictions or decisions expressed as outputs or assessments 120. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange). Regression algorithms aim at quantifying some items (for example, by providing a value that is a real number). The machine-learning algorithms utilize the training data 112 to find correlations among identified features 102 that affect the outcome.

The machine-learning algorithms utilize features 102 for analyzing the data to generate assessments 120. A feature 102 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

In one example embodiment, the features 102 may be of different types and may include one or more of words of the message 103, message concepts 104, communication history 105, past user behavior 106, subject of the message 107, other message attributes 108, sender 109, and user data 110.

The machine-learning algorithms utilize the training data 112 to find correlations among the identified features 102 that affect the outcome or assessment 120. In some example embodiments, the training data 112 includes labeled data, which is known data for one or more identified features 102 and one or more outcomes, such as detecting communication patterns, detecting the meaning of the message, generating a summary of the message, detecting action items in the message, detecting urgency in the message, detecting a relationship of the user to the sender, calculating score attributes, calculating message scores, etc.

With the training data 112 and the identified features 102, the machine-learning tool is trained at operation 114. The machine-learning tool appraises the value of the features 102 as they correlate to the training data 112. The result of the training is the trained machine-learning program 116.

When the machine-learning program 116 is used to perform an assessment, new data 118 is provided as an input to the trained machine-learning program 116, and the machine-learning program 116 generates the assessment 120 as output. For example, when a message is checked for an action item, the machine-learning program utilizes the message content and message metadata to determine if there is a request for an action in the message.

Machine learning techniques train models to accurately make predictions on data fed into the models (e.g., what was said by a user in a given utterance; whether a noun is a person, place, or thing; what the weather will be like tomorrow). During a learning phase, the models are developed against a training dataset of inputs to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs and is evaluated over several epochs to more reliably provide the output that is specified as corresponding to the given input for the greatest number of inputs for the training dataset. In another example, for an unsupervised learning phase, a model is developed to cluster the dataset into n groups and is evaluated over several epochs as to how consistently it places a given input into a given group and how reliably it produces the n desired clusters across each epoch.

Once an epoch is run, the models are evaluated and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, etc.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that it has not been trained on. In a second example, a false positive rate or false negative rate may be used to evaluate the models after finalization. In a third example, a delineation between data clusterings is used to select a model that produces the clearest bounds for its clusters of data.

Figure 2:
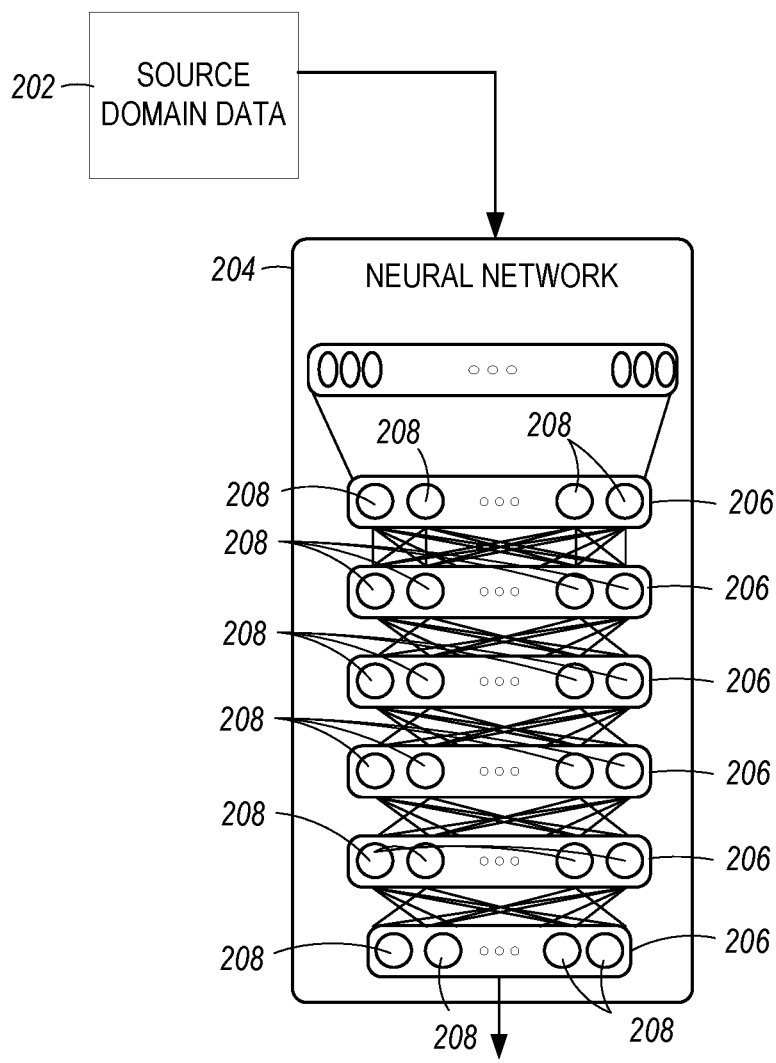
FIG. 2 illustrates an example neural network, in accordance with some embodiments.
Figure 2:
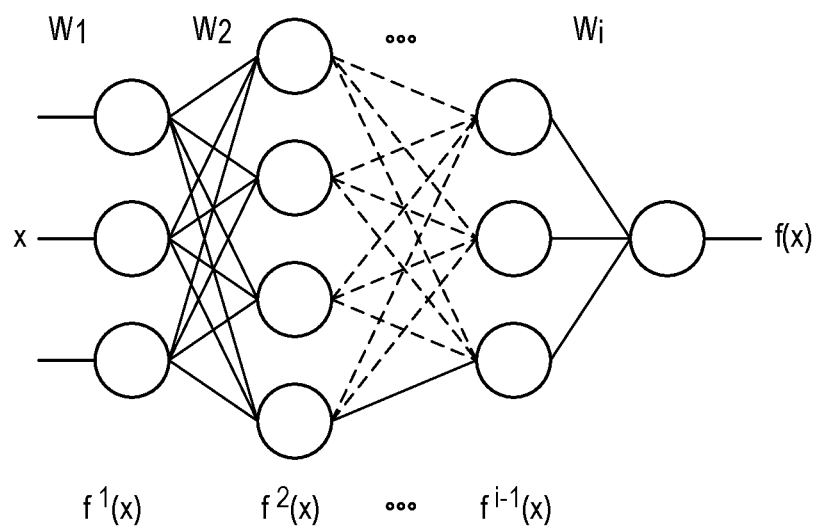

FIG. 2 illustrates an example neural network 204, in accordance with some embodiments. As shown, the neural network 204 receives, as input, source domain data 202. The input is passed through a plurality of layers 206 to arrive at an output. Each layer 206 includes multiple neurons 208. The neurons 208 receive input from neurons of a previous layer and apply weights to the values received from those neurons in order to generate a neuron output. The neuron outputs from the final layer 206 are combined to generate the output of the neural network 204.

As illustrated at the bottom of FIG. 2, the input is a vector x. The input is passed through multiple layers 206, where weights $W_1, W_2, \ldots, W_i$ are applied to the input to each layer to arrive at $f^1(x), f^2((x), \ldots, f^{-1}(x)$, until finally the output f(x) is computed. The weights are established (or adjusted) through learning and training of the network. As shown, each of the weights $W_1, W_2, \ldots, W_i$ is a vector. However, in some embodiments, the each of the weights may be a scalar.

Neural networks utilize features for analyzing the data to generate assessments (e.g., recognize units of speech). A feature is an individual measurable property of a phenomenon being observed. The concept of feature is related to that of an explanatory variable used in statistical techniques such as linear regression. Further, deep features represent the output of nodes in hidden layers of the deep neural network.

A neural network, sometimes referred to as an artificial neural network, is a computing system/apparatus based on consideration of neural networks of biological brains. Such systems/apparatus progressively improve performance, which is referred to as learning, to perform tasks, typically without task-specific programming. For example, in image recognition, a neural network may be taught to identify images that contain an object by analyzing example images that have been tagged with a name for the object and, having learned the object and name, may use the analytic results to identify the object in untagged images. A neural network is based on a collection of connected units called neurons, where each connection, called a synapse, between neurons can transmit a unidirectional signal with an activating strength (e.g., a weight as shown in FIG. 2) that varies with the strength of the connection. The weight applied for the output of a first neuron at the input of a second neuron may correspond to the activating strength. The receiving neuron can activate and propagate a signal to downstream neurons connected to it, typically based on whether the combined incoming signals, which are from potentially many transmitting neurons, are of sufficient strength, where strength is a parameter.

A deep neural network (DNN) is a stacked neural network, which is composed of multiple layers. The layers are composed of nodes, which are locations where computation occurs, loosely patterned on a neuron in the biological brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

Figure 3:
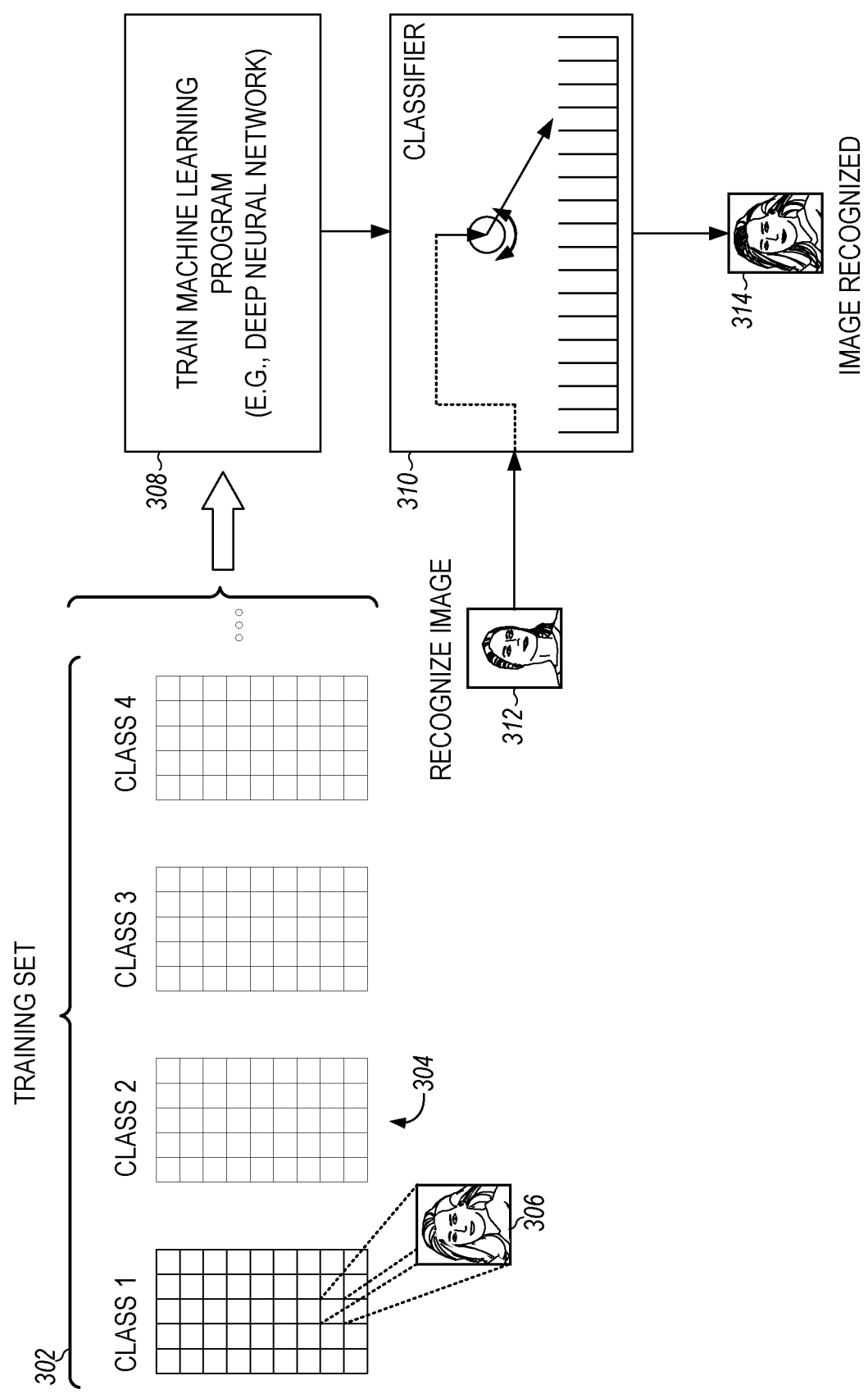
FIG. 3 illustrates the training of an image recognition machine learning program, in accordance with some embodiments.

FIG. 3 illustrates the training of an image recognition machine learning program, in accordance with some embodiments. The machine learning program may be implemented at one or more computing machines. Block 302 illustrates a training set, which includes multiple classes 304. Each class 304 includes multiple images 306 associated with the class. Each class 304 may correspond to a type of object in the image 306 (e.g., a digit 0-9, a man or a woman, a cat or a dog, etc.). In one example, the machine learning program is trained to recognize images of the presidents of the United States, and each class corresponds to each president (e.g., one class corresponds to Barack Obama, one class corresponds to George W. Bush, etc.). At block 308 the machine learning program is trained, for example, using a deep neural network. At block 310, the trained classifier, generated by the training of block 308, recognizes an image 312, and at block 314 the image is recognized. For example, if the image 312 is a photograph of Bill Clinton, the classifier recognizes the image as corresponding to Bill Clinton at block 314.

FIG. 3 illustrates the training of a classifier, according to some example embodiments. A machine learning algorithm is designed for recognizing faces, and a training set 302 includes data that maps a sample to a class 304 (e.g., a class includes all the images of purses). The classes may also be referred to as labels. Although embodiments presented herein are presented with reference to object recognition, the same principles may be applied to train machine-learning programs used for recognizing any type of items.

The training set 302 includes a plurality of images 306 for each class 304 (e.g., image 306), and each image is associated with one of the categories to be recognized (e.g., a class). The machine learning program is trained 308 with the training data to generate a classifier 310 operable to recognize images. In some example embodiments, the machine learning program is a DNN.

When an input image 312 is to be recognized, the classifier 310 analyzes the input image 312 to identify the class (e.g., class 314) corresponding to the input image 312.

Figure 4:
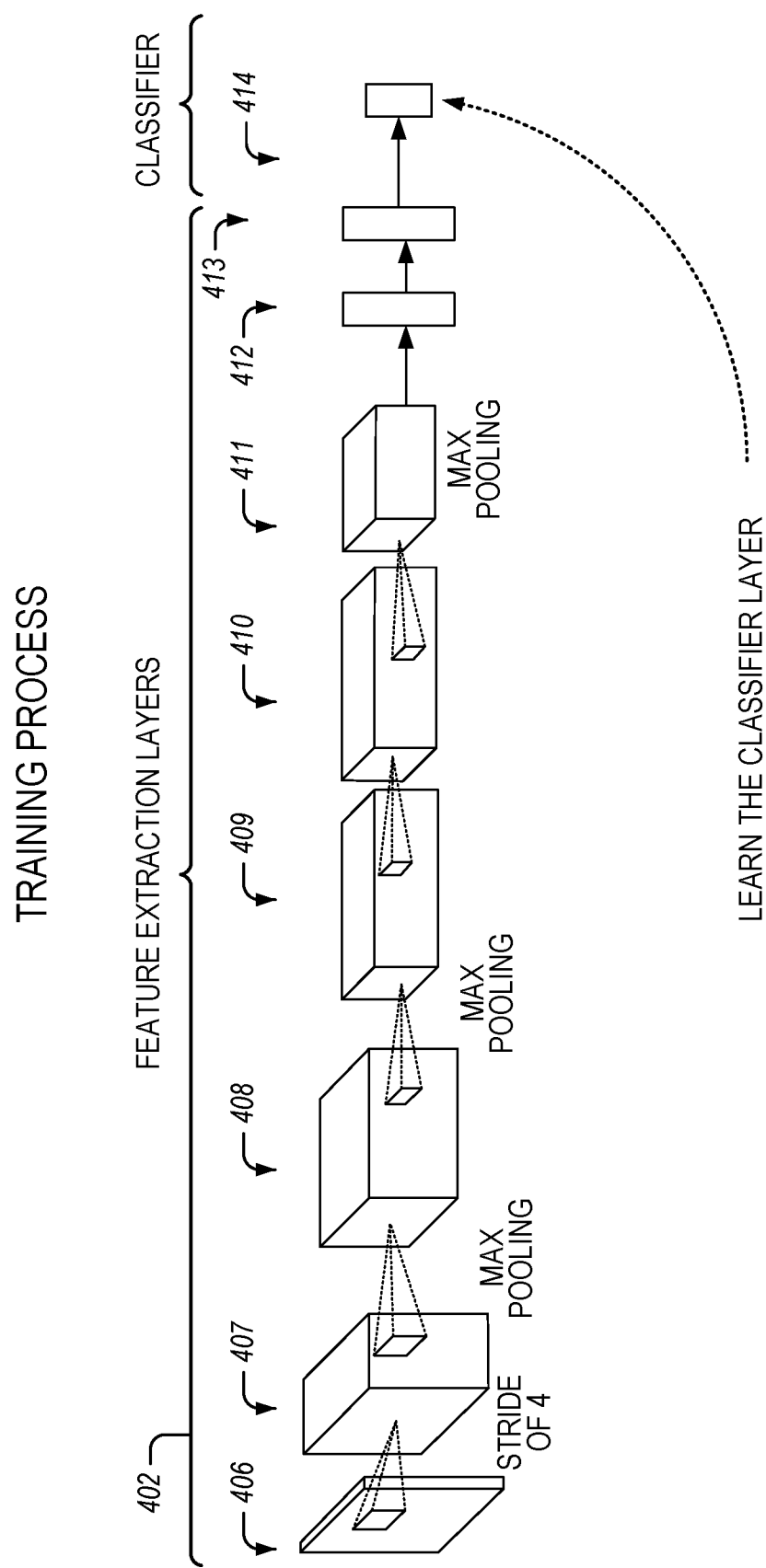
FIG. 4 illustrates the feature-extraction process and classifier training, in accordance with some embodiments.

FIG. 4 illustrates the feature-extraction process and classifier training, according to some example embodiments. Training the classifier may be divided into feature extraction layers 402 and classifier layer 414. Each image is analyzed in sequence by a plurality of layers 406-413 in the feature-extraction layers 402.

With the development of deep convolutional neural networks, the focus in face recognition has been to learn a good face feature space, in which faces of the same person are close to each other and faces of different persons are far away from each other. For example, the verification task with the LFW (Labeled Faces in the Wild) dataset has been often used for face verification.

Many face identification tasks (e.g., which may be applied to the datasets MegaFace and LFW) are based on a similarity comparison between the images in the gallery set and the query set, which is essentially a K-nearest-neighborhood (KNN) method to estimate the person's identity. In the ideal case, there is a good face feature extractor (inter-class distance is always larger than the intra-class distance), and the KNN method is adequate to estimate the person's identity.

Feature extraction is a process to reduce the amount of resources required to describe a large set of data. In some embodiments, feature extraction is used to extract biometrically relevant information from an image that enables recognition, spoof detection and/or other biometric tasks. A biometric template may represent the features that have been extracted.

In some example embodiments, feature extraction starts from an initial set of measured data and builds derived values (features) intended to be informative and non-redundant, facilitating the subsequent learning and generalization operations. Further, feature extraction is related to dimensionality reduction, such as reducing large vectors (sometimes with very sparse data) to smaller vectors capturing the same, or similar, amount of information.

In some embodiments, selected features are expected to contain the relevant information from the input data, so that the desired task can be performed by using this reduced representation instead of the complete initial data. DNN utilizes a stack of layers, where each layer performs a function. For example, the layer could be a convolution, a non-linear transform, the calculation of an average, etc. Eventually this DNN produces outputs by classifier 414. In FIG. 4, the data travels from left to right and the features are extracted. The goal of training the neural network is to find the weights for all the layers that make them adequate for the desired task.

As shown in FIG. 4, a "stride of 4" filter is applied at layer 406, and max pooling is applied at layers 407-413. The stride controls how the filter convolves around the input volume. "Stride of 4" refers to the filter convolving around the input volume four units at a time. Max pooling refers to down-sampling by selecting the maximum value in each max pooled region.

In some example embodiments, the structure of each layer is predefined. For example, a convolution layer may contain small convolution kernels and their respective convolution parameters, and a summation layer may calculate the sum, or the weighted sum, of two pixels of the input image. Training assists in defining the weight coefficients for the summation.

One way to improve the performance of DNNs is to identify newer structures for the feature-extraction layers, and another way is by improving the way the weights are identified at the different layers for accomplishing a desired task. The challenge is that for a typical neural network, there may be millions of weights to be optimized. Trying to optimize all these weights from scratch may take hours, days, or even weeks, depending on the amount of computing resources available and the amount of data in the training set.

Figure 5:
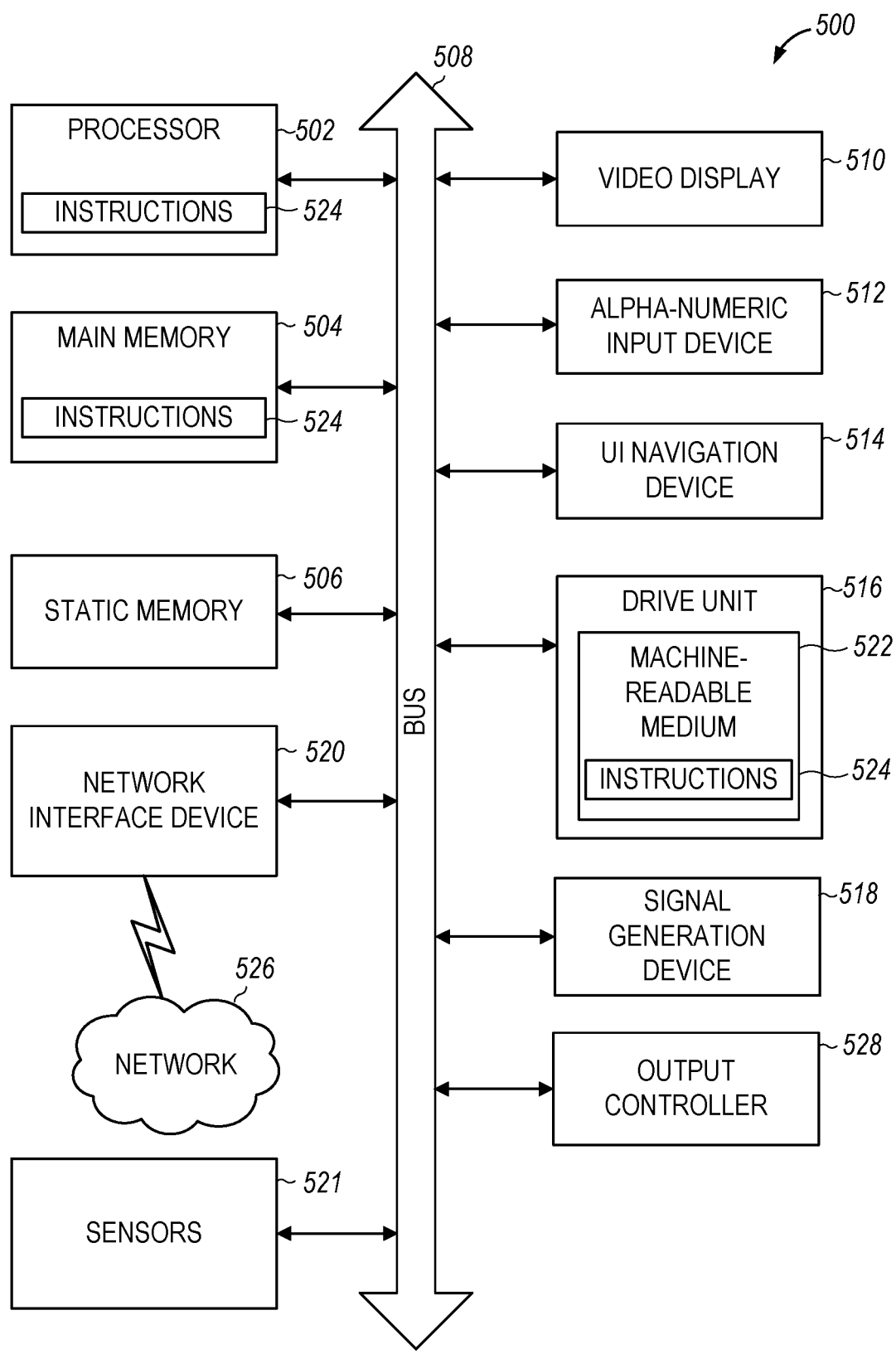
FIG. 5 is a block diagram of a computing machine, in accordance with some embodiments.

FIG. 5 illustrates a circuit block diagram of a computing machine 500 in accordance with some embodiments. In some embodiments, components of the computing machine 500 may store or be integrated into other components shown in the circuit block diagram of FIG. 5. For example, portions of the computing machine 500 may reside in the processor 502 and may be referred to as "processing circuitry." Processing circuitry may include processing hardware, for example, one or more central processing units (CPUs), one or more graphics processing units (GPUs), and the like. In alternative embodiments, the computing machine 500 may operate as a standalone device or may be connected (e.g., networked) to other computers. In a networked deployment, the computing machine 500 may operate in the capacity of a server, a client, or both in server-client network environments. In an example, the computing machine 500 may act as a peer machine in peer-to-peer (P2P) (or other distributed) network environment. In this document, the phrases P2P, device-to-device (D2D) and sidelink may be used interchangeably. The computing machine 500 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems/apparatus (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The computing machine 500 may include a hardware processor 502 (e.g., a central processing unit (CPU), a GPU, a hardware processor core, or any combination thereof), a main memory 504 and a static memory 506, some or all of which may communicate with each other via an interlink (e.g., bus) 508. Although not shown, the main memory 504 may contain any or all of removable storage and non-removable storage, volatile memory or non-volatile memory. The computing machine 500 may further include a video display unit 510 (or other display unit), an alphanumeric input device 512 (e.g., a keyboard), and a user interface (UI) navigation device 514 (e.g., a mouse). In an example, the display unit 510, input device 512 and UI navigation device 514 may be a touch screen display. The computing machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The computing machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 516 (e.g., a storage device) may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the computing machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the computing machine 500 and that cause the computing machine 500 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526.

Figure 6:
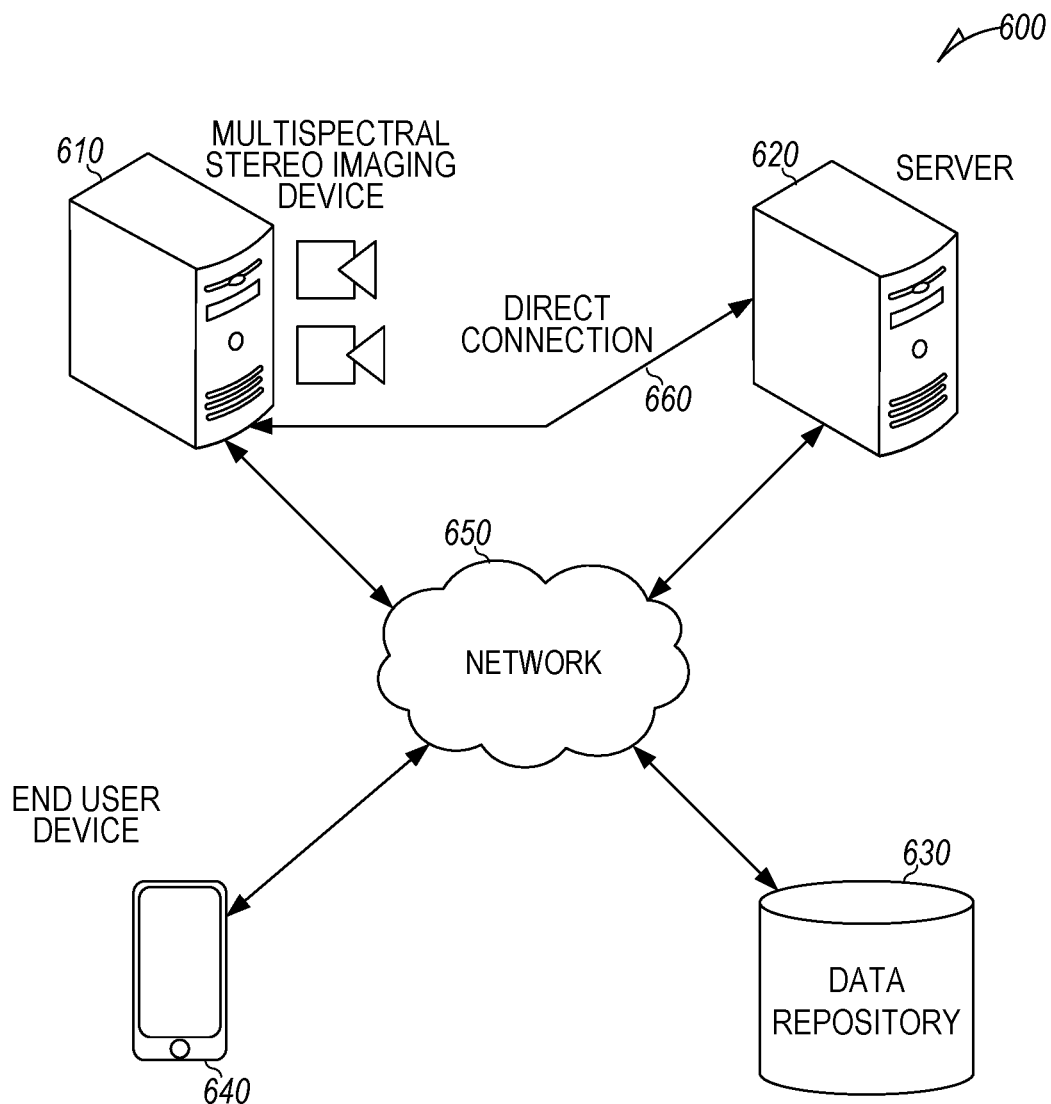
FIG. 6 illustrates an example system for enrollment in a multispectral stereo facial recognition system, in accordance with some embodiments.

FIG. 6 illustrates an example system 600 for enrollment in a multispectral stereo facial recognition system, in accordance with some embodiments. As shown, the system 600 includes a multispectral stereo imaging device 610, a server 620, a data repository 630, and an end-user device 640 connected to one another via a network 650. A direct connection 660 exists between the multispectral stereo imaging device 610 and the server 620. As shown, the multispectral stereo imaging device 610 is coupled with two cameras 612.1-2. Each of the multispectral stereo imaging device 610, the server 620, the data repository 630, and the end-user device 640 may include all or a portion of the components of the computing machine 500 shown in FIG. 5.

As shown, the multispectral stereo imaging device 610 and the server 620 are two separate machines connected via a direct connection 660. However, in some embodiments, a single machine may include both the multispectral stereo imaging device 610 and the server 620. In some aspects, there is no direct connection 660 and the multispectral stereo imaging device 610 and the server 620 are connected via the network 650 only. The direct connection 660 may be a direct wired (e.g., universal serial bus (USB) or Ethernet) or wireless (e.g., Bluetooth®) connection. The network 650 may include one or more of a local area network, a wide area network, a cellular network, a WiFi® network, a virtual private network (VPN), the Internet, an intranet, and the like.

The end-user device 640 may be any device with which an end-user may take a conventional image photograph of him/herself and transmit the conventional image photograph to the server 620 via the network 650. The end-user device 640 may include, for example, a mobile phone, a smartphone, a tablet computer, a laptop computer, a desktop computer, and the like. The end-user device may include a camera (e.g., a selfie camera or a webcam) for taking the conventional image photograph. Alternatively, the end-user may take a conventional image photograph with a camera that is not connected to the network 650, upload the conventional image photograph to the end-user device 640, and later transmit the conventional image photograph to the server 620.

The data repository 630 may store conventional image photograph(s) of multiple end-users of the multispectral stereo imaging device 610. The conventional image photographs may have been generated during employee badging, orientation, employee identity card creation, and the like. Using the techniques described herein, those conventional image photograph(s) may be used to generate biometric template(s) for use by the multispectral stereo imaging device 610 to identify the end-users.

Figure 7:
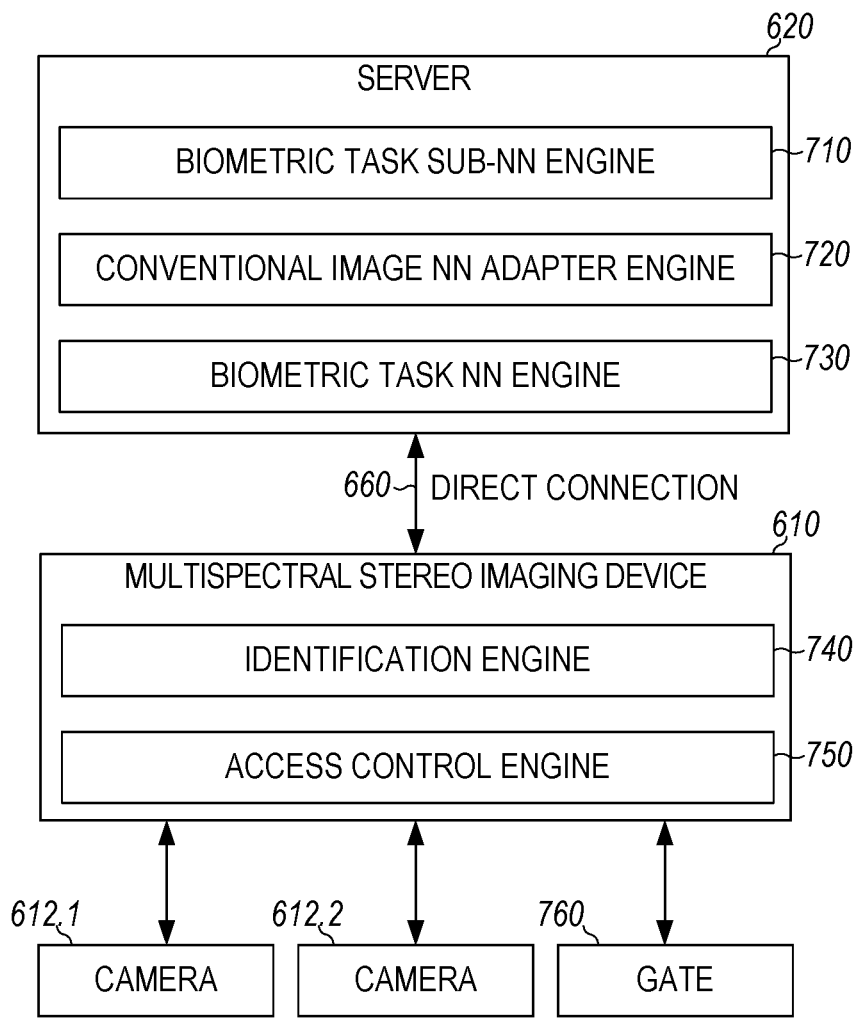
FIG. 7 is a block diagram illustrating an example server and multispectral stereo imaging device, in accordance with some embodiments.

FIG. 7 is a block diagram illustrating the server 620 and the multispectral stereo imaging device 610 in more detail than in FIG. 6, in accordance with some embodiments.

As shown, the server 620 includes a biometric task sub-neural network (NN) engine 710, a conventional image neural network (NN) adapter engine 720, and a biometric task neural network (NN) engine 730. The multispectral stereo imaging device 610 includes an identification engine 740 and an access control engine 750. The multispectral stereo imaging device 610 is coupled with the cameras 612.1-2 and a gate 760. The cameras 612.1-2 together may comprise a multispectral stereo image camera which generates multispectral stereo image data.

As illustrated, the server 620 and the multispectral stereo imaging device 610 include certain engines 710-750. However, it should be noted that other engines, other combinations of engines, or other software or hardware structures, may be used to perform these functionalities.

In some embodiments, the server 620 accesses conventional image data comprising a photograph of a first person. The server 620 converts, using the conventional image neural network adapter engine 720, the conventional image data into a model data format representing the first person. The model data format is a format that is standardized for both conventional image data and stereo pair image data. The server 620 generates, using the biometric task neural network engine 730 and based on the model data format data representing the first person, a task output representing the first person. The server transmits (e.g., to the multispectral stereo imaging device 610 via the direct connection or via the network 650 to any device(s) connected thereto) a representation of the task output representing the first person.

In some embodiments, the server 620 accesses stereo pair image data representing a second person. The stereo pair image data comprises at least a first image from a first lens position and a second image from a second lens position. The first lens position is different from the second lens position. The server 620 converts, using the biometric task sub-neural network engine 710, the stereo pair image data into model data format data representing the second person. The server generates, using the biometric task neural network engine and based on the model data format data representing the second person, a task output representing the second person. The server transmits (e.g., to the multispectral stereo imaging device 610 via the direct connection or via the network 650 to any device(s) connected thereto) a representation of the task output representing the second person.

The multispectral stereo imaging device 610 receives multispectral stereo image data from the cameras 612.1-2 (which may be part of the multispectral stereo imaging device 610 or connected to the multispectral stereo imaging device). While two cameras 612.1-2 are shown, it should be noted that the technology may be implemented with any number of cameras, not necessarily two. Alternatively, the two cameras 612.1-2 may represent a single camera that moves or two stationery lenses of the same camera. The cameras 612.1-2 may have the same spectral response or different spectral responses. The spectral response may be narrow (monochrome) or broad. According to some embodiments, the cameras 612.1-2 include a camera 612.1 that includes a wideband imager (red, green, blue, and infrared) and a camera 612.2 that detects wavelength longer than 600 nm (orange, red, and infrared). In some aspects, at least one of the cameras 612.1-2 may be webcam configured for video calling to assist information technology (IT) personnel in remotely servicing the multispectral stereo imaging device 610.

The multispectral stereo image data may be received, from the cameras 612.1-2, in real-time, for example, when an end-user attempts to access a physical location or electronic resource secured by the multispectral stereo imaging device. The multispectral stereo imaging device 610 determines, using the identification engine 640, which uses the biometric template (or multiple biometric templates), whether the specific person (or one of multiple previously-identified specific persons) is represented in the multispectral stereo image data. The multispectral stereo imaging device 610 controls, using the access control engine 750, access to the physical location (e.g., via the physical gate 760) or the electronic resource (e.g., by opening an application, providing access to a file or unlocking a computing machine) based on whether the specific person is represented in the multispectral stereo image data. If the multispectral stereo imaging device 610 detects the specific person via the cameras 612.1-2, the multispectral stereo imaging device 610 may transmit a control signal to open the gate 760. If the multispectral stereo imaging device 610 is unable to detect the specific person, the end-user may be able to access the physical location or the electronic resource in another manner, for example, by presenting an identity document to a security guard, entering a password, or scanning a barcode (e.g., on an employee badge).

The gate 760 may be in communication with the multispectral stereo imaging device 610 and may control access to a physical location such as an office building, a warehouse, and the like, which only authorized persons (e.g., employees of a business) may enter. The multispectral stereo imaging device 610, by operation of the access control engine 750, may open the gate 760 when the identification engine 740 identifies that an authorized person is detected by the cameras 612.1-2. Other techniques for opening the gate may also be available. For example, a security guard may be able to manually open the gate when he/she verifies a person's identity document. Alternatively, authorized persons may have badges with barcode(s), which, when presented to one or more of the cameras 612.1-2, may trigger the multispectral stereo imaging device 610 to transmit a control signal to open the gate 760.

In some cases, the conventional image neural network adapter engine 720 and the biometric task neural network engine 730 are part of a single neural network (the same neural network) and are trained simultaneously. The neural adapter engine may include two or fewer layers. The biometric task neural network engine 730 is a DNN comprising three or more layers.

The conventional image neural network adapter engine 720 may be a U-Net. A U-Net is a CNN that includes a contracting path and an expansive path, which gives it the u-shaped architecture. The contracting path is a typical convolutional network that consists of repeated application of convolutions, each followed by a rectified linear unit (ReLU) and a max pooling operation. During the contraction, the spatial information is reduced while feature information is increased. The expansive pathway combines the feature and spatial information through a sequence of up-convolutions and concatenations with high-resolution features from the contracting path.

The conventional image neural network adapter engine 720 may be trained using a contrastive or triplet loss function in conjunction with an iterative stochastic gradient descent algorithm. A kernel size of the conventional image neural network adapter engine 720 may be n×n, where n is a positive integer less than or equal to three.

Above, certain functionality is described as being performed at the multispectral stereo imaging device 610 or at the server 620. However, in some embodiments, some of the functions of the server 620 are performed at the multispectral stereo imaging device 610. In some embodiments, some of the functions of the multispectral stereo imaging device 610 are performed at the server 620. In some embodiments, a single machine (or group of machines/server farm) encompasses both the multispectral stereo imaging device 610 and the server 620.

Figure 8:
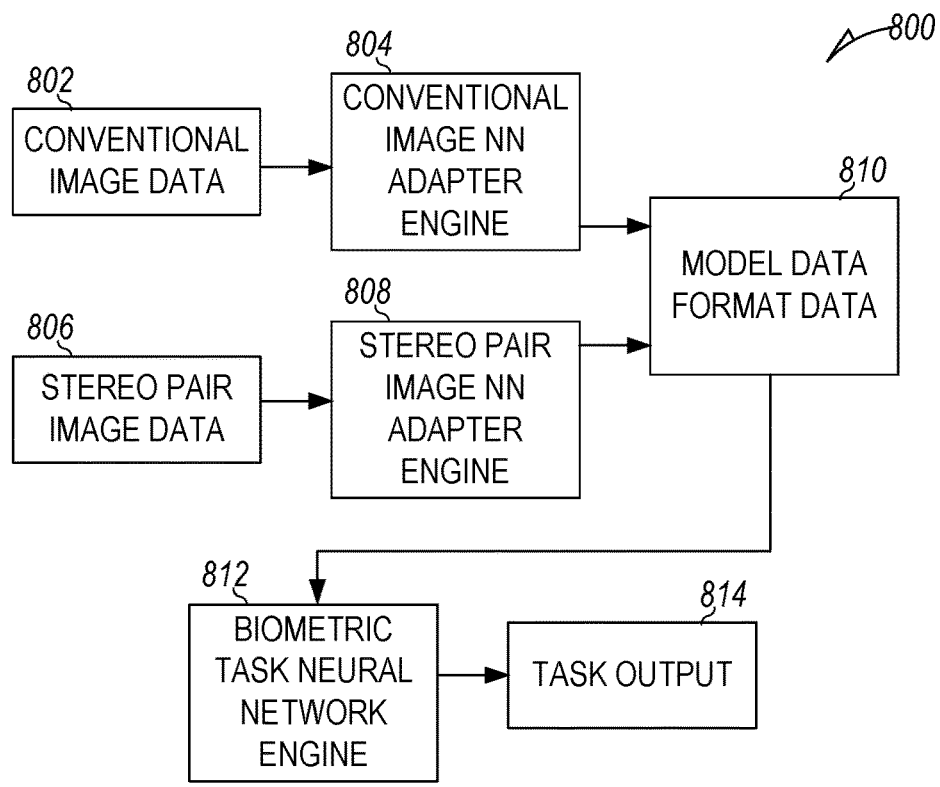
FIG. 8 is a data flow diagram illustrating a process for generating a task output using conventional image data or stereo image pair data, in accordance with some embodiments.

FIG. 8 is a data flow diagram illustrating a process 800 for generating a task output using conventional image data or stereo image pair data, in accordance with some embodiments.

Conventional image data 802 is provided as input. The conventional image data is fed to a conventional image neural network (NN) adapter engine 804 (which may correspond to the conventional image NN adapter engine 720). The conventional image NN adapter engine 804 generates model data format data 810 corresponding to the conventional image data 802.

Stereo pair image data 806 is provided as input. The stereo pair image data is fed to a stereo pair image NN adapter engine 808 (which may correspond to the biometric task sub-NN engine 710). The stereo pair image NN adapter engine 808 generates model data format data 810 corresponding to the stereo pair image data 806.

The model data format data 810 is provided to a biometric task neural network engine 812 (which may correspond to the biometric task NN engine 730). The biometric task neural network engine 812 generates a task output 814 representing a person depicted in the conventional image data 802 or the stereo pair image data 806.

Figure 9:
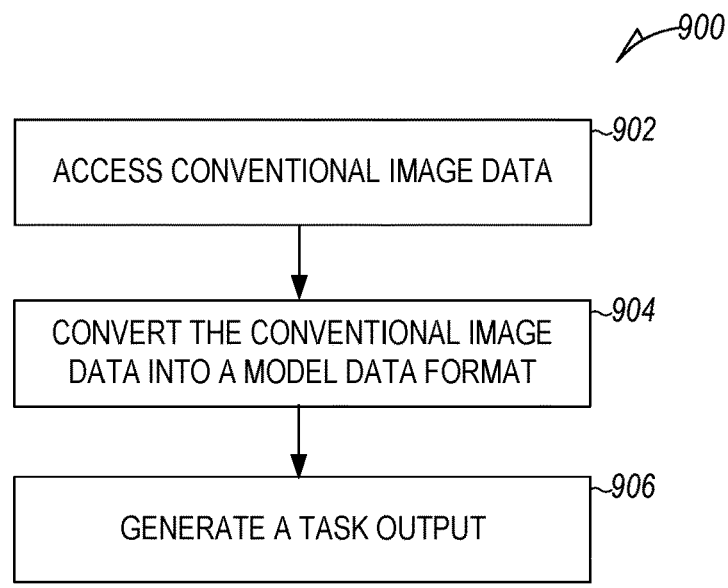
FIG. 9 is a flow chart illustrating an example method for generating a task output using conventional image data, in accordance with some embodiments.

FIG. 9 is a flow chart illustrating an example method 900 for generating a task output using conventional image data, in accordance with some embodiments. The method 900 may be implemented using one or more computing machines (e.g., the computing machine 500).

At operation 902, the one or more computing machines access conventional image data comprising a photograph of a first person.

At operation 904, the one or more computing machines convert, using a conventional image neural network adapter engine, the conventional image data into a model data format representing the first person. The model data format is a format that is standardized for both conventional image data and stereo pair image data. In some examples, the one or more computing machines convert the conventional image data into the model data format by synthesizing a stereo image pair from the conventional image data.

At operation 906, the one or more computing machines generate, using a biometric task neural network engine and based on the model data format data representing the first person, a task output representing the first person. The one or more computing machines transmit (e.g., via a direct connection or via a network) a representation of the task output representing the first person. The task output may include one or more of: an identity verification result, an identification result, and a spoof detection result. After operation 906, the method 900 ends In some embodiments, upon a failure to determine that a specific person is represented in the multispectral stereo image data, the multispectral stereo imaging device reads a barcode via the multispectral stereo image camera. Based on the barcode, the multispectral stereo imaging device controls access to the physical location or the electronic resource or initiates an enrollment operation via the multispectral stereo image camera.

Some embodiments relate to a multispectral stereo biometric system for facial recognition and other forms of biometric authentication (e.g., iris, periocular, gait, multi-modal combining of two or more of the foregoing, etc.).

A stereo imaging system represents one technology for collecting and using three-dimensional (3D) information about the face which is generally considered to be useful for improving recognition performance as well as discriminating against various attempts to spoof the system with non-living faces (e.g., printed pictures, digital pictures, videos, etc.). Other methods for collecting 3D image information include structured light, and time of flight.

Although 3D facial recognition technologies are generally understood to provide advantages over two-dimensional (2D) imaging methods (e.g., color or near infrared), one of the significant hurdles to adoption is the need to re-enroll people in the facial recognition systems that are based on these specialized 3D imaging technologies. When deployed in an enterprise environment with thousands of employees, biometric enrolment (or re-enrollment) is generally understood to be both time consuming and expensive.

For this reason, it may be useful to have a system and method that enables the enrollment of people into multi-spectral stereo facial recognition system using ordinary 2D images such as selfies, images previously acquired and used for employee badging, or images used for enrollment in a previous conventional facial recognition system. Further, it may be useful for the biometric system to be able to perform additional functionality that aids enrollment, on-going authentication processes, and/or other enterprise functions.

The extraction of features for face recognition may be performed using a DNN operating directly on the stereo image pair. This is done in order to access the latent 3D information present in the stereo pair rather than performing various preprocessing steps to explicitly extract a 3D estimate which is both time consuming and prone to errors. Specifically, a typical processing flow is to detect the face in each of the stereo pair of images, crop to the detected bounding box, resize each of the cropped faces to a standard size (NX×NY), and then stack the two cropped, resized images along the channel dimension. In the case of RGB (red, green, blue) images (three channels), this then yields an NX×NY×6 plane data volume that is then used as the input into the DNN. The training of such a network proceeds. For example a contrastive or triplet loss function may be used in conjunction with an iterative stochastic gradient descent algorithm in order to train the DNN to produce normalized embeddings that are relatively close (e.g., as measured by Euclidean distance) for stereo image data acquired from the same person and relatively far for stereo images acquired from two different people. Other formulations may be used as well. For example, pairs of stereo image pairs may be presented to the DNN, which then has a classifier output. The classifier network is then trained to discriminate between matched stereo pairs and unmatched stereo pairs.

Regardless of the exact formulation of the extractor/matcher and the particular network architecture, such networks may be trained to provide similar outputs in the case where an ordinary 2D image (e.g., a conventional image) is matched to a stereo image pair. However, as described, the stereo pair may be represented as a NX×NY×6 data volume while the 2D image is typically an NX×NY×3 data volume. One way to train a single DNN to accommodate both 2D-stereo matching and stereo-stereo matching is to pass the 2D image through a small adapter network with weights that are learned along with the rest of the DNN during training. The simplest adapter network is a single 2D convolution that operates on the 3 input planes and produces 6 output (feature) planes. The kernel size of such a network maybe 1×1, 3×3 or any other convenient size. As an alternative, the adapter network may be a much more complex structure such as a U-Net which is often used in various pixel-pixel translation schemes. Alternatively, the adapter network may be architected in a variety of other ways.

In another embodiment, instead of an adapter network used to convert the NX×NY×3 input image, instead the image may just be doubled such that the first channel plane is identical to the fourth, the second is identical to the fifth and the third identical to the sixth. Another embodiment uses the image for the first three planes of the input and sets the values of the other three planes to zero or some other value(s).

In contrast to the foregoing options that adapt the 2D image such that it is compatible with the stereo pair, another alternative is to separate the stereo pair into two 2D images. In such a way the network may be trained to match any combination of 2D images either extracted from stereo pairs or collected from ordinary 2D imaging systems. However, these approaches might, in some cases, reduce the ability of the network to extract and benefit from the latent 3D information available in the stereo pair.

Whichever method is used to homogenize the 2D images with the stereo pair it may be useful to include an indicator with each input image that is associated with the origin of the image, for example, 2D image or stereo pair. In such a way the network can be configured to incorporate an origin-specific learned embedding into the image analysis. For example, the indicator may point to one of two learned embeddings that are added to (or concatenated with) the feature planes at some layer of the DNN. Such mechanisms provide a means to help the network to operate with disparate data types.

Once an artificial neural network is trained to be able to match either stereo-stereo pairs or 2D-stereo pairs of faces it can be deployed and used as the engine for a multispectral stereo facial recognition system with the capability of using ordinary 2D images for enrollment (and/or subsequent matching if desired). One desirable use of such a method is to be able to import a previous enrollment database from a 2D imaging system that is being replaced in order to forego the need for new enrollments in the multispectral stereo system. Alternatively, an enterprise deploying the multispectral facial recognition system may have a database of images that were acquired and used to generate employee badges or other such purposes. These images can also be used as enrollment images in the manner described herein.

Another alternative to enable employees to self-enroll by using their smartphones or webcams to take a selfie. As long as the security and integrity of such images are maintained with appropriate software and data handling procedures, such selfies may be used as enrollment images.

Unlike many types of 3D imaging systems (or even systems based on near-infrared 2D imaging), the multispectral stereo imaging system disclosed herein is able to acquire images of figures displayed on digital displays like smartphones and tablets. Because of this, the multispectral stereo system can acquire and process images of barcodes and the like. Such barcodes may encode temporary one-time passwords (OTPs) that can be used to enhance the security of the enrollment process. For example, if a 2D enrollment image is imported and used as the enrollment for the multispectral facial biometric system, a policy may be put in place that during first use the employee needs to be sent an OTP that she displays on her phone to the biometric system shortly before or after presenting her face. After verification of both the biometric and the OTP, the enrollment may be replaced or augmented by the just-acquired multispectral stereo image pair. Other uses of the visual OTP could be as a work-around for false failures to match, as a second factor in a multifactor system, or used to initiate an in-situ enrollment at the reader.

In addition to the use of the multispectral stereo system for facial recognition, spoof detection, or OTP barcode acquisition, as discussed, the system may also be used as an ordinary webcam. In particular the imager in the stereo module with imaging characteristics close to ordinary color imaging may be used. Such an interface may enable video service calls and other communications of the sort. Further such a webcam may be used for monitoring, surveillance, and for capturing video used for auditing various aspects of the system operation or occurrences in proximity of the biometric system.

One embodiment includes the neural adapter engine 720 to homogenize 2D images with stereo pairs. One embodiment includes the ability to enroll in a multispectral stereo imaging system using ordinary 2D images (e.g., selfies, existing conventional facial biometric databases, employee badging databases, etc.). One embodiment includes the ability to acquire data from images displayed on a portable device, for example, a barcode OTP displayed on a smartphone, and use the acquired data to perform functions within the biometric system. The functions may include one or more of: self-enrollment, multifactor authentication, alternative authentication in case of failure to match, and the like. One embodiment includes the ability to use one of the cameras 612.1-2 of the multispectral stereo imaging device 610 as a webcam.

Some aspects are described below as numbered examples (Example 1, 2, 3, etc.). These numbered examples do not limit the technology disclosed herein.

Example 1 is a system comprising: processing circuitry; and a memory storing instructions which, when executed by the processing circuitry, cause the processing circuitry to perform operations comprising: accessing conventional image data comprising a photograph of a first person; converting, using a conventional image neural network adapter engine, the conventional image data into a model data format representing the first person, wherein the model data format is a format that is standardized for both conventional image data and stereo pair image data; generating, using a biometric task neural network engine and based on the model data format data representing the first person, a task output representing the first person; and transmitting a representation of the task output representing the first person.

In Example 2, the subject matter of Example 1 includes, the operations further comprising: accessing stereo pair image data representing a second person, wherein the stereo pair image data comprises at least a first image from a first lens position and a second image from a second lens position, wherein the first lens position is different from the second lens position; converting the stereo pair image data into model data format data representing the second person; generating, using the biometric task neural network engine and based on the model data format data representing the second person, a task output representing the second person; and transmitting a representation of the task output representing the second person.

In Example 3, the subject matter of Example 2 includes, wherein converting the stereo pair image data into the model data format data representing the second person is accomplished using a biometric task sub-neural network engine.

In Example 4, the subject matter of Examples 1-3 includes, wherein converting the conventional image data into model data format data comprises synthesizing a stereo pair image from the conventional image data.

In Example 5, the subject matter of Examples 1-4 includes, wherein the conventional image neural network adapter engine comprises a U-Net.

In Example 6, the subject matter of Examples 1-5 includes, wherein the task output comprises one or more of: an identity verification result, an identification result, and a spoof detection result.

In Example 7, the subject matter of Examples 1-6 includes, wherein a kernel size of the conventional image neural network adapter engine is n×n, wherein n is a positive integer less than or equal to three.

Example 8 is a non-transitory machine-readable medium storing instructions which, when executed by processing circuitry of one or more computing machines, cause the processing circuitry to perform operations comprising: accessing conventional image data comprising a photograph of a first person; converting, using a conventional image neural network adapter engine, the conventional image data into a model data format representing the first person, wherein the model data format is a format that is standardized for both conventional image data and stereo pair image data; generating, using a biometric task neural network engine and based on the model data format data representing the first person, a task output representing the first person; and transmitting a representation of the task output representing the first person.

In Example 9, the subject matter of Example 8 includes, the operations further comprising: accessing stereo pair image data representing a second person, wherein the stereo pair image data comprises at least a first image from a first lens position and a second image from a second lens position, wherein the first lens position is different from the second lens position; converting the stereo pair image data into model data format data representing the second person; generating, using the biometric task neural network engine and based on the model data format data representing the second person, a task output representing the second person; and transmitting a representation of the task output representing the second person.

In Example 10, the subject matter of Example 9 includes, wherein converting the stereo pair image data into the model data format data representing the second person is accomplished using a biometric task sub-neural network engine.

In Example 11, the subject matter of Examples 8-10 includes, wherein converting the conventional image data into model data format data comprises synthesizing a stereo pair image from the conventional image data.

In Example 12, the subject matter of Examples 8-11 includes, wherein the conventional image neural network adapter engine comprises a U-Net.

In Example 13, the subject matter of Examples 8-12 includes, wherein the task output comprises one or more of: an identity verification result, an identification result, and a spoof detection result.

In Example 14, the subject matter of Examples 8-13 includes, wherein a kernel size of the conventional image neural network adapter engine is n×n, wherein n is a positive integer less than or equal to three.

Example 15 is a method comprising: accessing conventional image data comprising a photograph of a first person; converting, using a conventional image neural network adapter engine, the conventional image data into a model data format representing the first person, wherein the model data format is a format that is standardized for both conventional image data and stereo pair image data; generating, using a biometric task neural network engine and based on the model data format data representing the first person, a task output representing the first person; and transmitting a representation of the task output representing the first person.

In Example 16, the subject matter of Example 15 includes, accessing stereo pair image data representing a second person, wherein the stereo pair image data comprises at least a first image from a first lens position and a second image from a second lens position, wherein the first lens position is different from the second lens position; converting the stereo pair image data into model data format data representing the second person; generating, using the biometric task neural network engine and based on the model data format data representing the second person, a task output representing the second person; and transmitting a representation of the task output representing the second person.

In Example 17, the subject matter of Example 16 includes, wherein converting the stereo pair image data into the model data format data representing the second person is accomplished using a biometric task sub-neural network engine.

In Example 18, the subject matter of Examples 15-17 includes, wherein converting the conventional image data into model data format data comprises synthesizing a stereo pair image from the conventional image data.

In Example 19, the subject matter of Examples 15-18 includes, wherein the conventional image neural network adapter engine comprises a U-Net.

In Example 20, the subject matter of Examples 15-19 includes, wherein the task output comprises one or more of: an identity verification result, an identification result, and a spoof detection result.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system comprising:
processing circuitry; and
a memory storing instructions which, when executed by the processing circuitry, cause the processing circuitry to perform operations comprising:
accessing conventional image data comprising a photograph of a first person;
converting, using a conventional image neural network adapter engine, the conventional image data into a model data format representing the first person, wherein the model data format is a format that is standardized for both conventional image data and stereo pair image data, wherein the conventional image neural network adapter engine comprises a contraction path and an expansion path, wherein the contraction path reduces spatial information and increases feature information, wherein the expansion path combines the feature information and the spatial information generated by the contraction path;
generating, using a biometric task neural network engine and based on the model data format data representing the first person, a task output representing the first person; and
transmitting a representation of the task output representing the first person.

2. The system of claim 1, the operations further comprising:
accessing stereo pair image data representing a second person, wherein the stereo pair image data representing the second person comprises at least a first image from a first lens position and a second image from a second lens position, wherein the first lens position is different from the second lens position;
converting the stereo pair image data representing the second person into model data format data representing the second person;
generating, using the biometric task neural network engine and based on the model data format data representing the second person, a task output representing the second person; and
transmitting a representation of the task output representing the second person.

3. The system of claim 2, wherein converting the stereo pair image data representing the second person into the model data format data representing the second person is accomplished using a biometric task sub-neural network engine.

4. The system of claim 1, wherein converting the conventional image data into model data format data comprises synthesizing the stereo pair image data from the conventional image data.

5. The system of claim 1, wherein the conventional image neural network adapter engine comprises a U-Net.

6. The system of claim 1, wherein the task output comprises one or more of: an identity verification result, an identification result, and a spoof detection result.

7. The system of claim 1, wherein a kernel size of the conventional image neural network adapter engine is n×n, wherein n is a positive integer less than or equal to three.

8. A non-transitory machine-readable medium storing instructions which, when executed by processing circuitry of one or more computing machines, cause the processing circuitry to perform operations comprising:

accessing conventional image data comprising a photograph of a first person;

converting, using a conventional image neural network adapter engine, the conventional image data into a model data format representing the first person, wherein the model data format is a format that is standardized for both conventional image data and stereo pair image data, wherein the conventional image neural network adapter engine comprises a contraction path and an expansion path, wherein the contraction path reduces spatial information and increases feature information, wherein the expansion path combines the feature information and the spatial information generated by the contraction path;

generating, using a biometric task neural network engine and based on the model data format data representing the first person, a task output representing the first person; and transmitting a representation of the task output representing the first person.

9. The machine-readable medium of claim 8, the operations further comprising:

accessing stereo pair image data representing a second person, wherein the stereo pair image data representing the second person comprises at least a first image from a first lens position and a second image from a second lens position, wherein the first lens position is different from the second lens position;

converting the stereo pair image data representing the second person into model data format data representing the second person;

generating, using the biometric task neural network engine and based on the model data format data representing the second person, a task output representing the second person; and transmitting a representation of the task output representing the second person.

10. The machine-readable medium of claim 9, wherein converting the stereo pair image data representing the second person into the model data format data representing the second person is accomplished using a biometric task sub-neural network engine.

11. The machine-readable medium of claim 8, wherein converting the conventional image data into model data format data comprises synthesizing the stereo pair image data from the conventional image data.

12. The machine-readable medium of claim 8, wherein the conventional image neural network adapter engine comprises a U-Net.

13. The machine-readable medium of claim 8, wherein the task output comprises one or more of: an identity verification result, an identification result, and a spoof detection result.

14. The machine-readable medium of claim 8, wherein a kernel size of the conventional image neural network adapter engine is n×n, wherein n is a positive integer less than or equal to three.

15. A method comprising:

accessing conventional image data comprising a photograph of a first person;

converting, using a conventional image neural network adapter engine, the conventional image data into a model data format representing the first person, wherein the model data format is a format that is standardized for both conventional image data and stereo pair image data, wherein the conventional image neural network adapter engine comprises a contraction path and an expansion path, wherein the contraction path reduces spatial information and increases feature information, wherein the expansion path combines the feature information and the spatial information generated by the contraction path;

generating, using a biometric task neural network engine and based on the model data format data representing the first person, a task output representing the first person; and transmitting a representation of the task output representing the first person.

16. The method of claim 15, further comprising:

accessing stereo pair image data representing a second person, wherein the stereo pair image data representing the second person comprises at least a first image from a first lens position and a second image from a second lens position, wherein the first lens position is different from the second lens position;

converting the stereo pair image data representing the second person into model data format data representing the second person;

generating, using the biometric task neural network engine and based on the model data format data representing the second person, a task output representing the second person; and transmitting a representation of the task output representing the second person.

17. The method of claim 16, wherein converting the stereo pair image data representing the second person into the model data format data representing the second person is accomplished using a biometric task sub-neural network engine.

18. The method of claim 15, wherein converting the conventional image data into model data format data comprises synthesizing the stereo pair image data from the conventional image data.

19. The method of claim 15, wherein the conventional image neural network adapter engine comprises a U-Net.

20. The method of claim 15, wherein the task output comprises one or more of: an identity verification result, an identification result, and a spoof detection result.

* * * * *